(12) United States Patent
Teruyuki et al.

(10) Patent No.: US 7,689,644 B2
(45) Date of Patent: Mar. 30, 2010

(54) DATA COMMUNICATION SYSTEM, BACKUP SERVER, AND COMMUNICATION CONTROL APPARATUS

(75) Inventors: Hasegawa Teruyuki, Kamifukuoka (JP); Hasegawa Toru, Kamifukuoka (JP)

(73) Assignee: KDDI Corporation, Tokyo (JP)

( * ) Notice: Subject to any disclaimer, the term of this patent is extended or adjusted under 35 U.S.C. 154(b) by 6 days.

(21) Appl. No.: 11/071,654

(22) Filed: Mar. 2, 2005

(65) Prior Publication Data
US 2005/0195818 A1    Sep. 8, 2005

(30) Foreign Application Priority Data
Mar. 4, 2004    (JP)    ............... 2004-060528

(51) Int. Cl.
    *G06F 15/16*    (2006.01)
(52) U.S. Cl. ..................................... 709/201
(58) Field of Classification Search ................. 709/201
    See application file for complete search history.

(56) References Cited

U.S. PATENT DOCUMENTS

| | | | |
|---|---|---|---|
| 6,704,278 B1* | 3/2004 | Albert et al. ................ | 370/216 |
| 6,839,865 B2* | 1/2005 | Gould et al. .................. | 714/6 |
| 7,107,334 B1* | 9/2006 | Shaffer et al. ................ | 709/224 |
| 2003/0142670 A1* | 7/2003 | Gould et al. .................. | 370/390 |
| 2004/0008693 A1* | 1/2004 | Grove et al. ........... | 370/395.52 |
| 2004/0078624 A1* | 4/2004 | Maxemchuk et al. .......... | 714/4 |
| 2004/0100970 A1* | 5/2004 | Gerdisch et al. ....... | 370/395.53 |

OTHER PUBLICATIONS

Dapeng et al., "Scalable video coding and transport over broadband wireless networks", Proceedings of the IEEE vol. 89, Issue 1, Jan. 2001 pp. 6-20.*
Yeadon et al., "Filters: QoS support mechanisms for multipeer communications", Selected Areas in Communications, IEEE Journal on vol. 14, Issue 7, Sep. 1996 pp. 1245-1262.*
Takeshi et al., "Method, apparatus and program for transmitting broadcast communication content . . . ", JP Publication No. 2004-040604, Feb. 5, 2004 [Machine Translation].*

* cited by examiner

*Primary Examiner*—Vivek Srivastava
*Assistant Examiner*—William J Goodchild
(74) *Attorney, Agent, or Firm*—David G. Conlin; Steven M. Jensen; Edwards Angell Palmer & Dodge LLP

(57) ABSTRACT

In order to distribute multicast packets, using different multicast addresses and avoiding fault points, a backup server is installed close to a master and converts backup multicast packets and sends them as master multicast packets to the client. At this time, backup multicast packets are delayed and sent while the delay is determined from an allowable retransmission time, a one-direction delay to the client, a time required to detect linkage problems, and a time required to establish backup paths and so on.

3 Claims, 7 Drawing Sheets

DATA COMMUNICATION SYSTEM, BACKUP SERVER, AND COMMUNICATION CONTROL APPARATUS

BACKGROUND OF THE INVENTION

1. Field of the Invention

The present invention relates to data communication systems, backup servers, and communication control apparatuses that distribute continuous stream packets to multiple clients from at least one server via an IP (Internet Protocol) network.

Priority is claimed on Japanese Patent Application No. 2004-60528, filed Mar. 4, 2004, the content of which is incorporated herein by reference.

2. Description of Related Art

Multicasting is defined in the third layer of OSI (Open Systems Interconnection), to realize the service of distributing motion pictures and so on, and various protocols compatible with multicasting are implemented and used (see as an example, "Developing IP Multicast Networks Volume 1.1" by Beau Williamson from Cisco Systems (The Cisco Press Design and Implementation Series); ISBN: 1578700779). Also, various kinds of multicast communication protocols with high reliability are proposed to support multicast communication without data loss (see as an example, "The Reliable Multicast Design Space for Bulk Transfer" by M. Handley and five others, published by Internet Society 2000).

FEC (Forward Error Correction) is described in Handley above and the methods based on FEC are generally used to recover lost packets on the multicast distribution network today. In the systems providing these methods, a receiving side corrects errors in the packets according to error recovery information, attached to the packets from the sender side. The error recovery information might include information for single or multiple packets. The error recovery information can be sent at the same time when the corresponding packets are sent or the error recovery information corresponding to different packets can be sent in parallel if it is required. Also, Handley discloses various methods for data retransmission based on sending back ACK (acknowledgement) or NACK (negative-acknowledgement) from the receiver side.

FIG. 7 and FIG. 8 show one example of the multicast communication system for broadcasting providing redundant construction network. In these figures, multicast server for broadcasting 10 provides master 1 which distributes multicast packets. 3a and 3b are L2 switches, and 4a-4f are L3 switches. An L2 switch checks and decides the destination of each packet and transmits it according to the protocol of data link layer (the second layer). Switching hub is one example of the L2 switch. L3 switch checks and decides the destination of each packet and transmit it according to the protocol of network layer (the third layer). Router is one example of the L3 switch. 6 is an apartment house which includes multiple clients that are the destination of multicast packets distribution.

A join control message (for example, IGMP join), for joining the multicast network, is sent from the apartment house 6 when each one of clients requested to receive multicast packets. Based on the join control message, L3 switch 4a and so on decide communication paths for multicast packets, and master 1 sends the multicast packets to the apartment house 6.

As FIG. 7 shows a existing communication system with multicast protocol in which routers (L3 switches 4a-4f) have redundant structure to construct IP network with high reliability. However, for example, as shown in FIG. 8, it requires a few to several tens of seconds to change the multicast distribution path dynamically because of linkage trouble in L3 switch and so on. Furthermore, the data already distributed during a few to several tens of seconds, are lost.

On the other hand, communication systems based on FEC requires at least a fixed amount of redundant data to be transmitted regardless of whether or not there is a lost packet. Therefore, it is difficult to recover a large number of continuous packets. Moreover, the communication system based on retransmission algorithm, requires extra functions like ACK/NACK responding function for client terminals, and retransmission function for routers and sender terminals. Also, communication systems, based on the algorithm promising the delivery of all packets, there is a problem that delivery timing is not reliable.

To solve the above mentioned problems, an object of the invention is to provide communication systems, backup servers, and communication control apparatuses which recover lost data for few seconds because of linkage trouble and so on, and which realizes multicast communication preventing short breaks in data communication without any changes to the existing data communication terminals and relay nodes.

SUMMARY OF THE INVENTION

According to the first aspect of the invention, a communication system includes a distribution server which distributes a multicast packer for broadcast, a client that receives the multicast packer via a network, and a communication control device. The communication control device includes a first receiving device which receives the multicast packer from the distribution server; a generation device which delays the multicast packer, changes a destination of the multicast packet, and generates a first backup packet; a sending device which sends the first multicast packet to the network; a monitoring device which monitors receiving status of the multicast packet; a second receiving device which receives the first backup packet when the monitor device detects interruption of receiving the multicast packet because of a problem; a conversion device which changes a destination of the first backup packet to a destination of the multicast packet; and a distribution device which distributes the first backup packet for which the conversion device changed the destination.

According to the second aspect of the invention, in the communication system, the generation device copies the multicast packet and generates a second backup packet; the sending device sends the second backup packet to the network; the second receiving device receives the second backup packet; the conversion device changes a destination of the second backup packet to the destination of the multicast packet; and the distribution device distributes the second multicast packet for which the conversion device changed the destination.

According to the third aspect of the invention, in the communication system, the distribution device assigns an identification information to the first backup packet for which the conversion device changed the destination, in order to distinguish between the first backup multicast packet and the multicast packet.

According to the fourth aspect of the invention, in the communication system, the generation device copies the multicast packet and generates a second backup packet; the sending device sends the second backup packet to the network; the second receiving device receives the second backup packet; the conversion device changes a destination of the second backup packet to the destination of the multicast packet; and the distribution device assigns an identification information, to the second backup packet which the conversion device changed the destination, in order to distinguish between the second backup multicast packet and the multicast packet, and distributes the second multicast packet.

According to the fifth aspect of the invention, a backup server for a communication system including a distribution server which distributes a multicast packet for broadcast, and a client that receives the multicast packet via a network, includes a receiving device which receives the multicast packet from the distribution server; a generation device which delays the multicast packet, changes a destination of the multicast packet, and generates a first backup packet; and a sending device which sends the first backup packet to the network.

According to the sixth aspect of the invention, in the backup server, the generation device copies the multicast packet and generates a second backup packet; and the sending device sends the second backup packet to the network.

According to the seventh aspect of the invention, a communication control apparatus for a communication system including distribution server which distributes a multicast packet for broadcast and a client that receives the multicast packet via a network includes a monitor device monitors receiving status of the multicast packet; a receiving device receives a first backup packet, which is delayed and generated from the multicast packet by a backup server, when the monitor device detects interruption of the receipt of the first multicast packet because of a problem; a distribution device which changes a destination of the first multicast packet to a destination of the multicast packet and distributes the first multicast packet to the client.

According to the eighth aspect of the invention, in the communication control apparatus, the receiving device receives a second backup packet, which is generated by the backup server from a copy of the multicast packet; the conversion device changes a destination of the second backup packet to the destination of the multicast packet; and the distribution device sends the second backup packet, which the destination is changed by the conversion device, to the client.

According to the ninth aspect of the invention, in the communication control apparatus, the distribution device assigns an identification information, to the first backup packet which the destination is changed by the conversion device, in order to distinguish between the first backup multicast packet and the multicast packet.

According to the tenth aspect of the invention, in the communication control apparatus, the receiving device receives a second backup packet, which is generated by the backup server from a copy of the multicast packet; the conversion device changes a destination of the second backup packet to the destination of the multicast packet; and the distribution device assigns an identification information to the second backup packet which the destination is changed by the conversion device, in order to distinguish between the second backup multicast packet and the multicast packet, and sends the second backup packet, which the destination is changed by the conversion device, to the client.

According to this invention, it is possible to restart receiving packets in several tens of milliseconds because different backup communication paths are dynamically established, using different multicast addresses.

Also, it is possible to prevent unnecessary backup traffic in the normal situation because the establishment of backup communication path is requested only when interruption of the receipt of the data occurs.

DETAILED DESCRIPTION OF THE INVENTION

Figure 1:
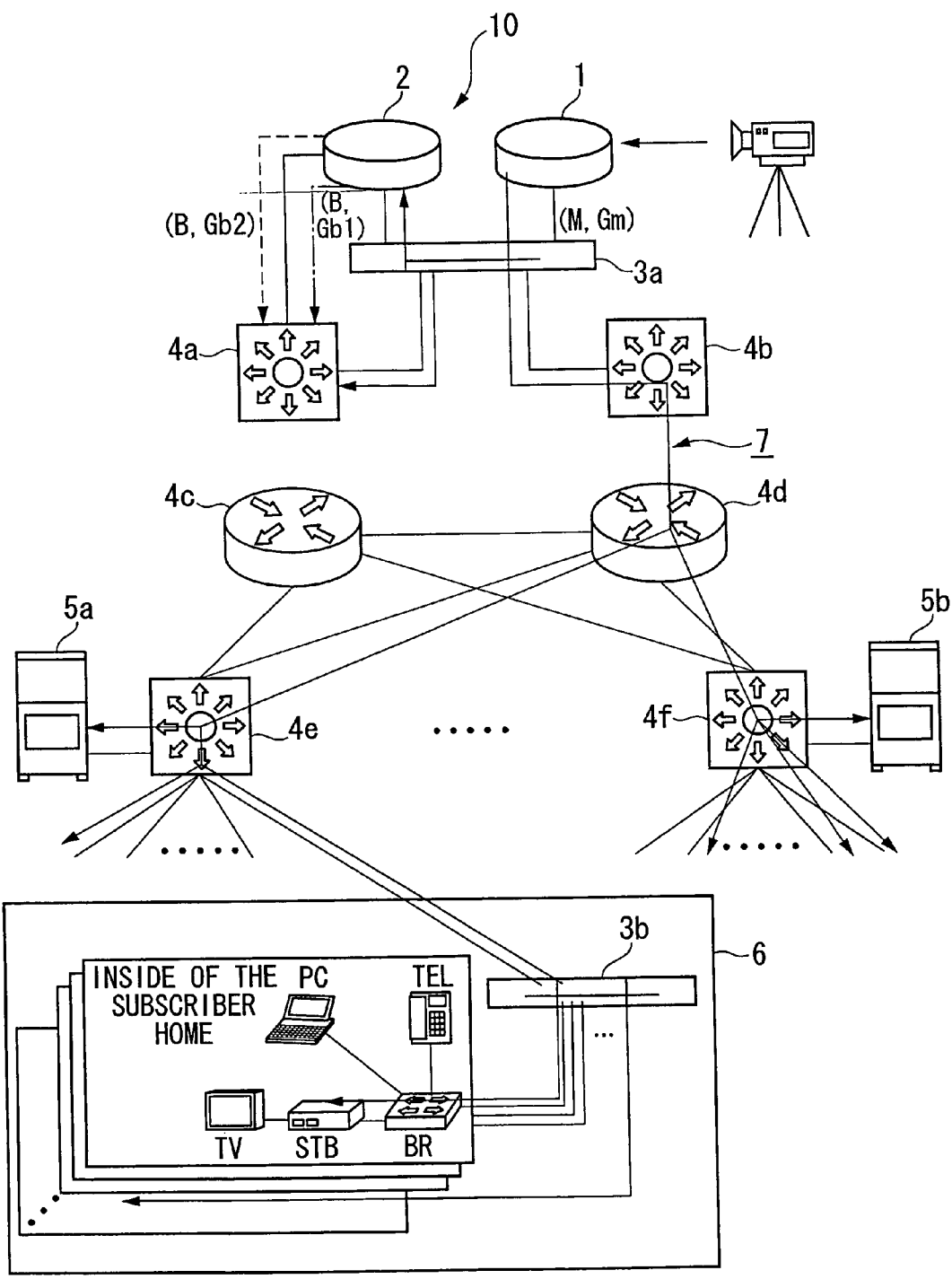
FIG. 1 is an outline construction figure which shows the construction of the multicast communication system for broadcasting in one embodiment in this invention.

Hereafter, the best mode to implement this invention is explained referring to the figures. FIG. 1 is an outline construction figure that shows a multicast communication system for broadcasting in one embodiment of this invention. In this figure, multicast server for broadcasting 10 provides 2 servers, master 1, and backup server 2. Master 1 supplies multicast packets to apartment house 6. Backup server 2 is a server for backup, installed close to master 1. 3a and 3b are L2 switches and 4a-4f are L3 switches. 5a and 5b are gateways that distribute backup multicast packets to apartment house 6 when the distribution of multicast packets is stopped because of some problems.

In apartment house 6, streaming data (continuous multicast packets) is received via STB (Set Top Box) or a PC, and is played. Backup server 2 receives multicast packets sent from master 1 (hereafter, a combination of sender side origin M and the destination Gm is referred to as (M, Gm)), assigns other multicast addresses to the packets, and constantly distributes them as backup multicast packets.

In this embodiment, it is assumed that a client performs buffering data for several tens of milliseconds to a few seconds before the play of the data. That is, this embodiment accepts an allowable arrival time between the arrival of packets (expected time) and the play of the packets. Also, it is assumed that the multicasting is within an ISP (Information Service Provider), and that the maximum delay time between server and client and the maximum fluctuation of the delay can be estimated.

While apartment house 6 is only one example and the present invention is not limited to the embodiment, multicast packets may be distributed to PCs in individual houses. Also, BR (Broadband Router) and TEL (TELephone) do not directly relate to the present invention, and may not be necessarily provided in other embodiments.

One of methods (1) and (2) described below may be applied as address change and distribution methods. Backup server 2 performs them.

(1) Two-Channel Backup Method

Destinations of the multicast packets are changed to Gb1 and Gb2, and both packets are distributed. That is, when backup server 2 receives a packet with (M, Gm), explained above, from master 1, backup server 2 creates two packets and sends them constantly. These two packets contain the same data, while their destinations are different. Destinations are changed to Gb1 and Gb2. The origin of the multicast packet is set as "B". That is, "B" is an address of backup server 2, and backup server 2 changes the origin of the packet to "B". (B, Gb1), one of two multicast packets, is sent with no delay after backup server 2 receives (M, Gm). (B, Gb2), one of two multicast packets, is sent with a predetermined delay ($\Delta t$ (e.g., 50 ms)). A distribution path for (B, GB1) is shown with dashed lines, and a distribution path for (B, GB2) is shown with alternate long and short dash lines in FIG. 1. The reason of the delay will be explained below. The delay time is determined according to an allowable retransmission time, a one-direction delay to the client, a time required to detect linkage trouble, and a time required for arrival of a multicast send request.

(2) One-Channel Backup Method

A difference from the two-channel backup method above is that only (B, Gb2) is sent constantly. The send request for (B, Gb2) and (B, Gb1) is issued only when the communication linkage is disconnected. Therefore, in a normal situation, there is no load on the IP network 7, except for L3 switch 4a which is directly connected to backup server 2.

Figure 2:
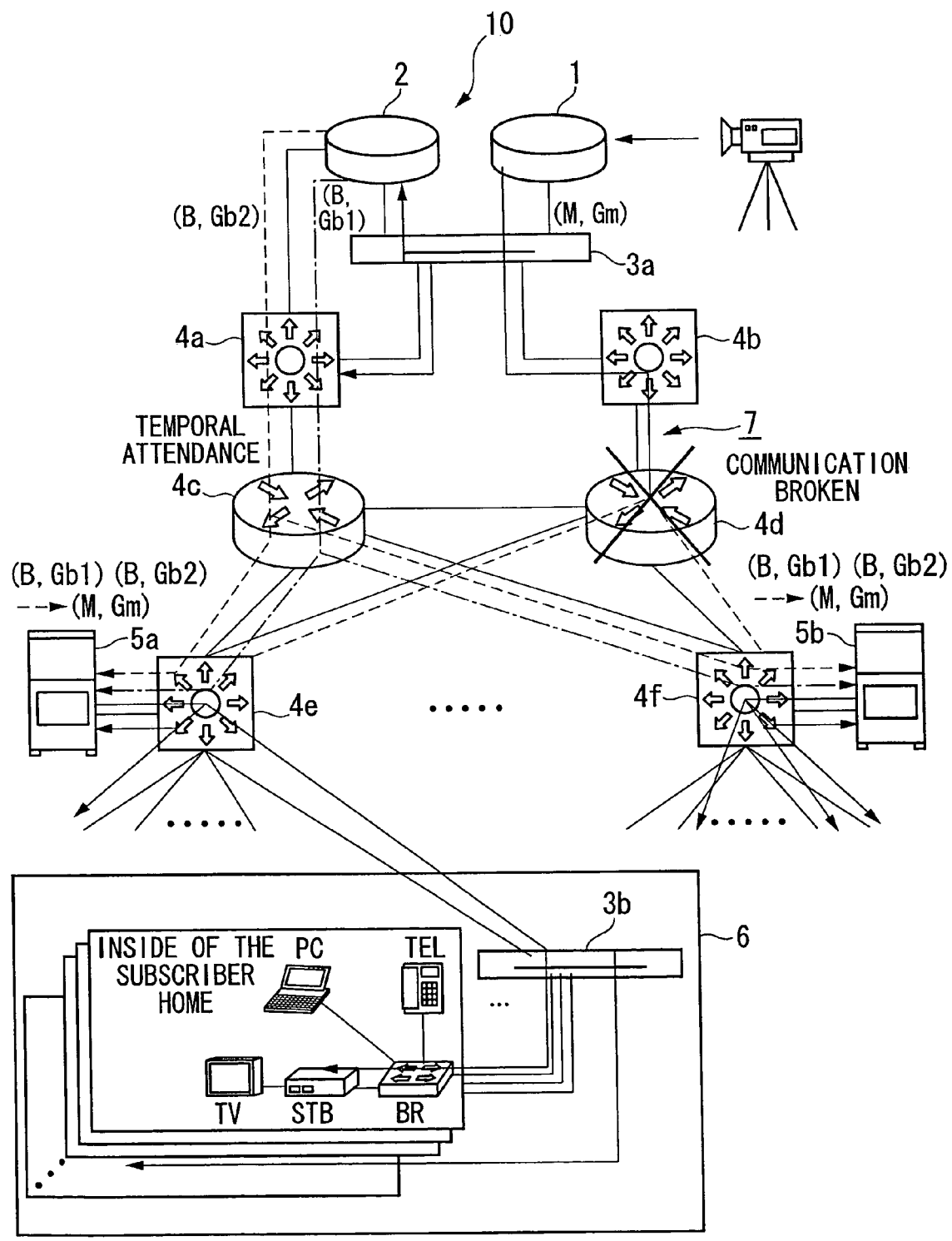
FIG. 2 is an outline construction figure which explains the backup distribution path for the case that the short break of data receiving is detected in one embodiment in this invention.

A distribution tree is created to obtain different distribution paths for (B, Gb2) and (B, Gb1) from (M, Gm), since (B, Gb2) and (B, Gb1) are in different groups from (M, Gm) and since the network has redundant structure. For example, L3 switches 4a-4f performed this step by predefining the distribution paths in advance. Gateway 5a is installed close to switch 4e at the edge of the network close to apartment house 6. Hereafter a process of gateway 5a is described, and a process of gateway 5b is similar to that of gateway 5a. If necessary, gateway 5a starts receiving (M, Gm) and checks the receiving status constantly. When gateway 5a detects no receiving status for a predetermined time, gateway 5a determines interruption of receipt. FIG. 2 shows a backup distribution path when the interruption of the receipt is detected. FIG. 2 shows a situation in which L3 switch 4d has network linkage trouble.

When gateway 5a detects the interruption of the receipt, gateway 5a executes different processes shown below, according to the two-channel backup method or the one-channel backup method.

(1) Two-Channels Backup Method

First, gateway 5a joins networks to receive (B, Gb2) and (B, Gb1). Gateway 5a converts (B, Gb2) and (B, Gb1) to (M, Gm), and sends them to the client (apartment house 6). Here, gateway 5a embeds a signature (identification information), into an IP packet ID (TTL: Time to Live and check sum field) or some fields in multicast packets in the process of address conversion, so as to easily distinguish the converted packet from the packet before the conversion ((M, Gm)/(B, Gb1)/(B, Gb2)). On the other hand, when (B, Gb2) and (B, Gb1) are broadcasted at the same time, the order of the multicast packets may be altered. Therefore, gateway 5a broadcasts only Gb2, is separated from (B, Gb2) network, and then broadcasts only Gb1 according to the order of multicast packets.

Figure 3:
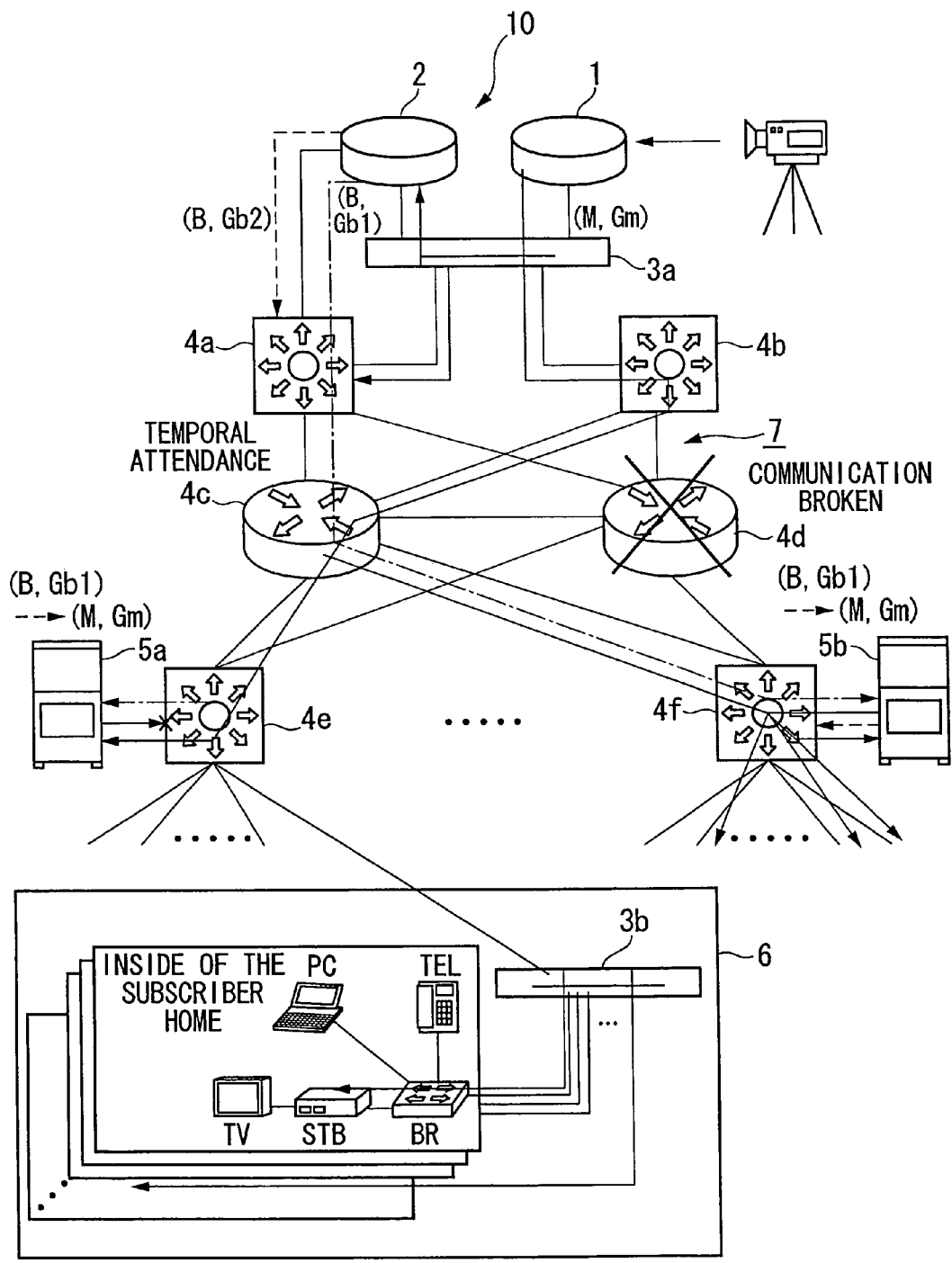
FIG. 3 is an outline construction figure which explains the recovery process from the backup distribution path to the recovered normal distribution path in one embodiment in this invention.

Moreover, gateway 5a continues joining (B, Gb2) from the arrival of the first packet until $\Delta t + \alpha$ has passed or until the same packet as (B, Gb1) is received. Here, $\alpha$ (e.g., 20 m sec) is determined according to changes in a data transmission delay in IP network 7. After $\Delta t + \alpha$ has passed, gateway 5a is separated from Gb2. Gateway 5a continues joining (B, Gb1) until it detects the receipt of (M, Gm) again, or until a predetermined time $\beta$ (e.g., 60 seconds) has passed from the arrival of the packet, and then is separated from Gb1. The time P may be determined according to a time required for a dynamic change of the multicast distribution path for (M, Gm) in L3 switches 4a-4f. FIG. 3 shows a situation of the dynamic change of the multicast distribution path when gateway 5a switches from backup distribution path to normal distribution path as the receipt (distribution path) is recovered.

(2) One-Channel Backup Method

First, gateway 5a joins (B, Gb2) network. Then, gateway 5a converts (B, Gb2) to (M, Gm) and distributes packets to the client (apartment house 6). Gateway 5a changes the network address of multicast packets so as to easily distinguish the converted packet from the multicast packets ((M, Gm)/(B, Gb2)) before conversion. Gateway 5a applies the similar method to the two-channel backup method described above. Also, gateway 5a continues joining (B, Gb2) network until it detects the receipt of (M, Gm) again, or until the predetermined time $\beta$ (e.g., 60 seconds) has passed, and is then separated from Gb2 network.

However, there is a possibility that gateway 5a requires some time to stop receiving multicast packets of (B, Gb1/Gb2) after it was separated from (B, Gb1/Gb2) network. To solve this problem, gateway 5a stops the converting process. That is, gateway 5a stops converting (B, Gb1/Gb2) to (M, Gm) at the same time as the separation from (B, Gb1/Gb2) network. Therefore, clients can receive all multicast packets of (M, Gm).

When the receipt of (B, Gm) is stopped because the communication linkage is disconnected because of problems, it may cause a delay from a time when gateway 5a detects the interruption of the communication linkage to a time when gateway 5a sends a join control message to (B, Gb2) and actually starts receiving (B, Gb2). During the delay, the multicast packets of (B, Gm) to be sent to the client may be lost. However, in this invention, (B, Gb2) is delayed in consideration of the allowable retransmission time, the one-direction delay to the client, the time required to detect the linkage trouble, and the arrival time of the multicast send request. Therefore, the packets which may be lost during the delay described above can be sent to the client.

Next, a concrete embodiment which employs the construction in FIG. 1 will be described. A PC providing multiple NICs (Network Interface Cards) is used as gateway 5a. Here, in this example, multiple network interfaces may be provided logically. Outline of concrete implementation will be described below.

Using one of the NICs installed backup server 2, (M, Gm) distributed from master 1 is constantly received. Specifically, the NIC can be mounted on L2 switch 3a which is commonly used by master 1. Alternatively, it can be realized by using port mirroring of optical couplers and L2/L3 switch, and by copying output data from master 1 and inputting the copied data to the NIC. Backup server 2 converts an input packet to (B, Gb2), delays it using a "dummynet" function of FreeBSD, and sends it from an NIC different from the above mentioned NIC. Moreover, backup server 2 copies the input packet, converts it to (B, Gb1), and sends it from an NIC different from the above mentioned NIC (only when the two-channels backup method is applied).

The above mentioned (B, Gb1/Gb2) is not sent to IP network 7 (which is closer to the client side than L3 switch 4a in FIG. 1) as long as a join request is not issued from gateway 5a. Gateway 5a which is connected to L3 switch 4e and 4f close to the client, and detects whether the client is joining (M, Gm) or not, according to one of the following methods.

Gateway 5a periodically confirms the join status of (M, Gm) to L3 switch 4e (e.g., every 5 seconds). Alternatively, gateway 5a monitors the join/separation messages to (M, Gm) (e.g., PIM join/prune) at the upstream direction of L3 switch 4e and the (M, Gm) stream using the method described above. When the joining to (M, Gm) is detected, gateway 5a starts monitoring the receipt of (M, Gm). In the former case, depending on whether the client joins (M, Gm), gateway 5a requests the joining to or the separation from (M, Gm) to L3 switch 4e. When the interruption of receipt is detected, gateway 5a joins (B, Gb2) and (B, Gb1) at the same time (the two-channel backup method). In the one-channel backup method, gateway 5a joins only (B, Gb2). These requests are issued to L3 channel 4e.

Gateway 5a converts both (B, Gb2) stream and (B, Gb1) stream into (M, Gm), and sends the data to a (M, Gm) receiving interface located in the upstream direction of L3 switch 4e. In order to recognize that these packets were converted from (B, Gb1/Gb2) to (M, Gm), the ID field of the multicast packet is modified so that a checksum field in an IP header is set to "0x7FFE" or "0xFFFE".

One example of a method for sending packet (M, Gm) from gateway 5a to L3 switch 4e, will be described below. Gateway 5a (NIC) sends the multicast packet to L3 switch 4e, using its own origination MAC (Media Access Control) address (MACG). In this example, the multicast packets of (M, Gm) with the different origination MAC addresses should be equally processed at L3 switch 4e. Alternatively, the multicast packets may have the origination MAC address of L3 switch 4c (MAC3) at the upstream position from L3 switch 4e, and may be sent to L3 switch 4e. In this case, an input from L3 switch 4c and an input from gateway 5a should be received physically or logically at the same port in order to avoid a bad influence on the MAC address learning function of L3 switch 4e. An example of a concrete process will be described below.

Figure 4:
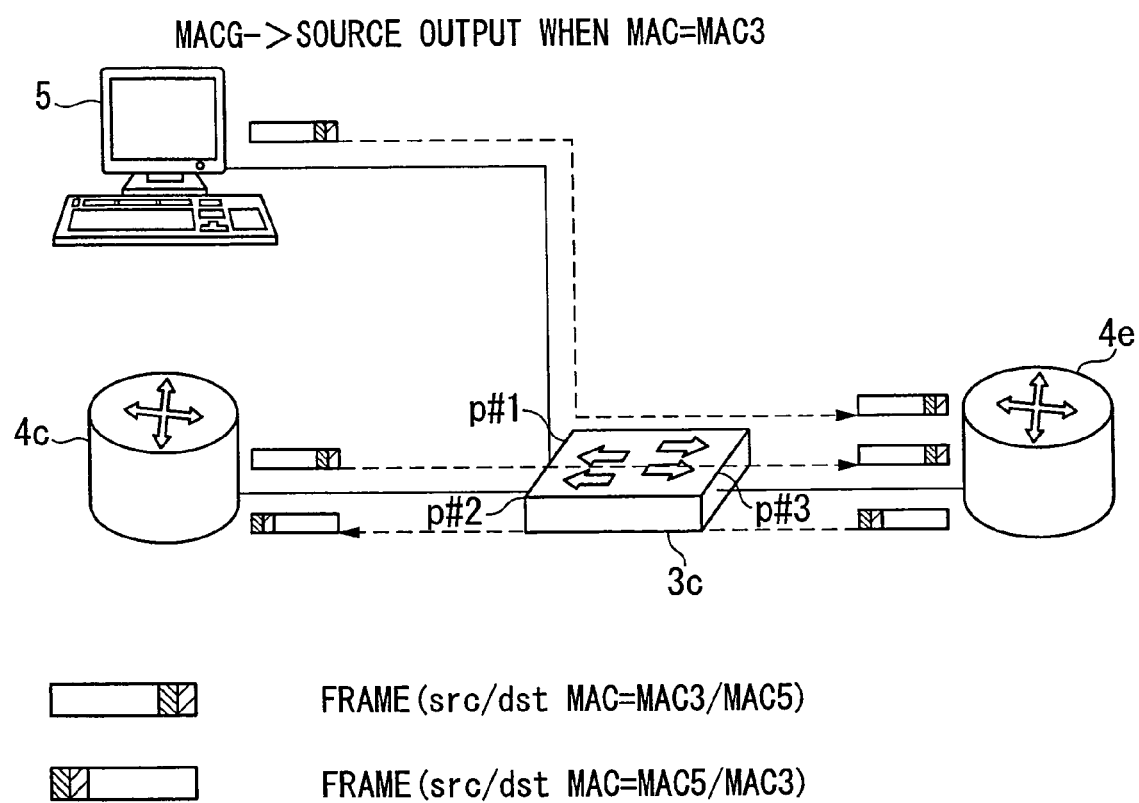
FIG. 4 is an outline construction figure which shows one example of the packet relay form from the gateway to the L3 switch in one embodiment in this invention.

As shown in FIG. 4, L2 switch 3c is installed at the upstream position from L3 switch 4e. Using a link aggregation function of L2 switch 3c, multiple ports (P#1, p#2) are considered as a single port logically. However, the settings of L3 switch 4c are not changed, or the same settings as those of L3 switch 4c are applied to L3 switch 4e. The link aggregation function is set so as to use the appropriate port (p#2) for the output from L2 switch 3c to L3 switch 4c. Using one of L2/L3 switches produced by CISCO Co. Ltd., it is possible to select an output port, based on the MAC address (origination MAC address: MAC5) of L3 switch 4e.

A dedicated bridge with three input/output NICs, is implemented with the PC and so on, and is installed at the upstream position from L3 switch 4e to achieve the same function as described above. This bridge merges the inputs from both of L3 switch 4c and gateway 5a, and outputs data to L3 switch 4e. When the bridge inputs data from L3 switch 4e, it outputs the data to gateway 5a in addition to L3 switch 4c.

One of the following methods is applied to detect the restart of the receipt of the multicast packets of (M, Gm). According to one of these methods, the (M, Gm) stream (with the original address, not converted) at the upstream from L3 switch 4e is monitored when possible. When it is not possible to monitor (M, Gm) stream at the upstream from L3 switch 4e, the (M, Gm) stream at the downstream from L3 switch 4e is monitored. However, the stream may contain the (M, Gm) converted from (B, Gb1/Gb2); therefore, the following conditions are applied to determine whether the receipt is restarted.

In the two-channel backup method, the following conditions are checked after the separation from Gb2 and the termination of the conversion. Specifically, the conditions are, in the normal situation, whether signature detections (IP checksum field="0x7FFF" or "0xFFFF" including TTL subtraction at L3 switch 4e) for more than $\gamma$ (e.g., 50 packets) are continuously failed, and/or whether a certain time $\beta$ has passed.

Figure 5:
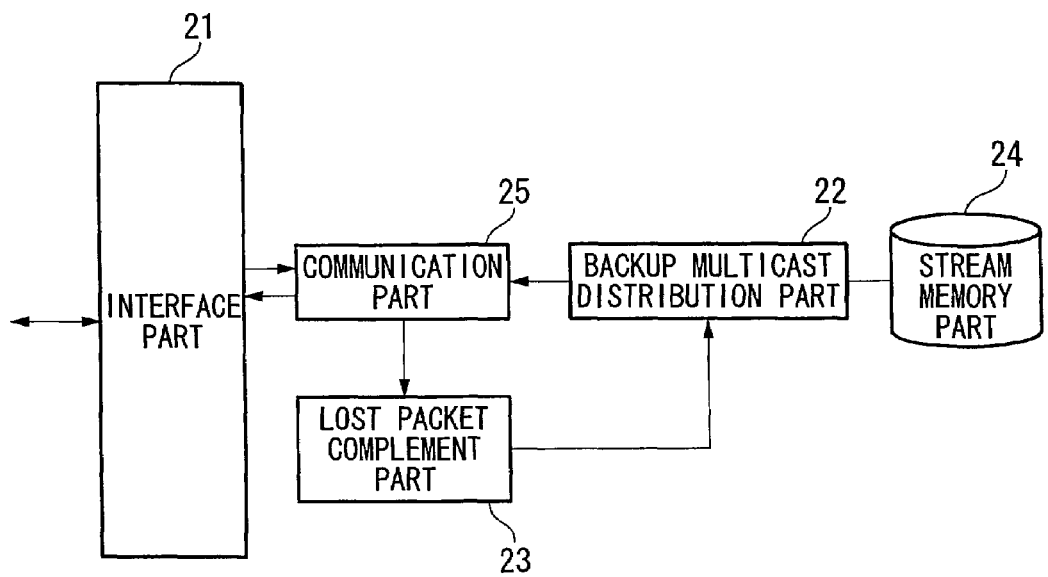
FIG. 5 is a block diagram which shows the construction of the backup server in one embodiment in this invention.
Figure 6:
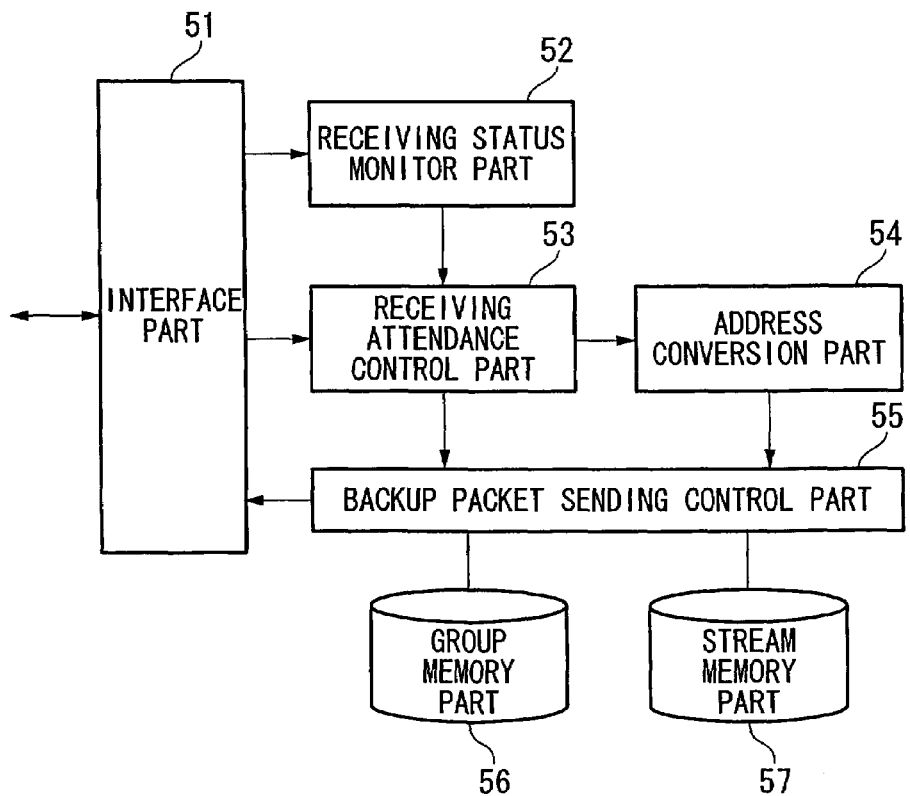
FIG. 6 is a block diagram which shows the construction of the gateway in one embodiment in this invention.
Figure 7:
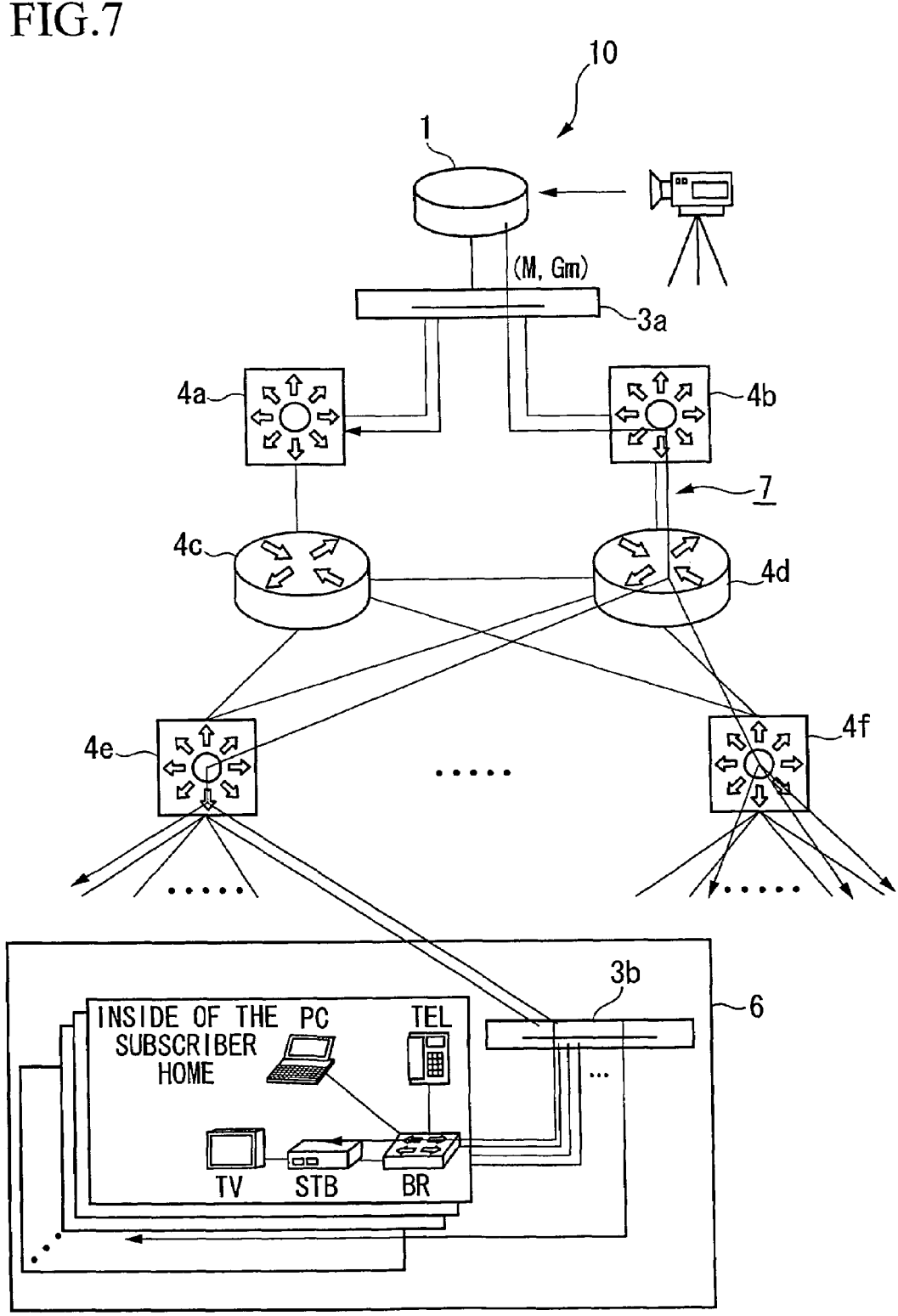
FIG. 7 is an outline construction figure which shows one example of the conventional multicast communication system for broadcasting in the redundant construction network.
Figure 8:
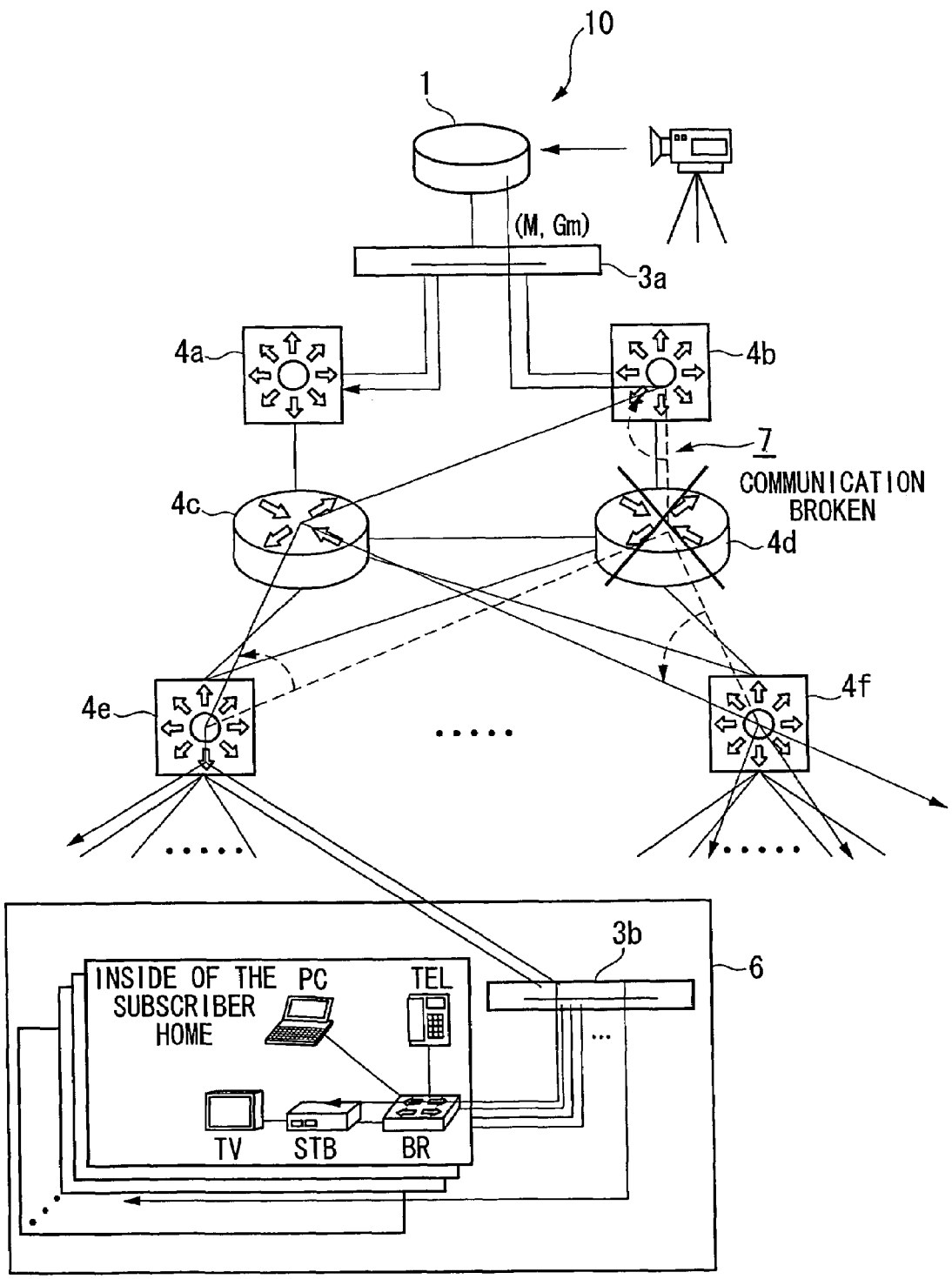
FIG. 8 is an outline construction figure which shows the conventional example that explains dynamic switching of a multicast distribution path in case of router trouble.

Next, the constructions of backup server 2 and gateways 5a and 5b in order to achieve the process described above, will be explained. FIGS. 5 and 6 are block diagrams which show examples of internal constructions of backup server 2 and gateways 5a and 5b, respectively. As shown in FIG. 5, backup server 2 is constructed with interface part 21, backup multicast distribution part 22, lost packet complement part 23, stream memory part 24, and communication part 25.

Interface part 21 works as an interface to IP network 7 and provides UDP/IP (User Datagram Protocol/Internet Protocol) or TCP/UDP/IP (Transmission Control Protocol/UDP/IP). Backup multicast distribution part 22 performs a backup function for the multicast packets sent from master 1, converts their multicast addresses to other addresses, and then distributes them to the multiple clients. Lost packet complement part 23 accepts redundant data created at a fixed rate, and has a function to complement the continuous multicast packets according to an FFC basis. Stream memory part stores received multicast packets to delay them. Communication part 25 sends and receives the multicast packets via interface part 21.

As described above, there are two methods to distribute the backup multicast packets. One of the methods is to distribute only the multicast packets with delay, determined based on changes in delay which occur in IP network 7. The other method is to distribute the delayed backup multicast packets and the backups of the received multicast packets at the same time.

As shown in FIG. 6, each of the gateways 5a and 5b is comprised of interface part 51, receiving condition monitor part 52, receiving join control part 53, address conversion part 54, backup packet sending control part 55, group memory part 56, and stream memory part 57.

Interface part 51 works as an interface to IP network 7 and provides UDP/IP or TCP/UDP/IP. Receiving condition monitor part 52 has a function for monitoring the receiving condition of multicast packets from master 1. Receiving join control part 53 has a function for joining the receiving network of the backup multicast packets with multicast addresses, converted into different address, when receiving condition monitor part 52 detects that no data is received for a predetermined time continuously.

The joining of receiving attendance control part 53 to the receiving network of the delayed backup multicast packets starts from the arrival of the first packet, and ends after a predetermined time determined based on changes in delay which occur in IP network 7 has passed, or after the arrival of the same packet as the backup multicast packet. Moreover, the joining of receiving join control part 53 to the receiving network of the backup multicast packets ends when the multicast packet sent from master 1 is detected again, or when a predetermined time has passed after the arrival of the first backup multicast packet. Then receiving join control part 53 is separated from the backup multicast packets receiving network.

Backup packet sending control part 55 has at least a function for changing the network addresses of the delayed backup multicast packets, the delay of which is determined based on changes in delay in IP network 7, to the addresses before the conversion, and distributes them to the clients. Backup packet sending control part 55 has a function for attaching the signature, to distinguish the backup multicast packets with addresses before conversion and the backup multicast packets with converted addresses, to the IP header when it distributes the multicast packets to the clients. Backup packet sending control part 55 has a function for distributing the delayed backup multicast packets sequentially, when it detects the separation from the backup multicast packets receiving network.

Group memory part 56 stores the distribution path for the distribution of the backup multicast packets. Stream memory part 57 stores the sequential multicast packets and backup multicast packets.

As described above, in this embodiment, the backup multicast packets are distributed, using other multicast addresses in order to allow the packets to avoid fault points. Therefore, backup server 2 is installed close to master 1, converts the backup multicast packets, and distributes them as master multicast packets to the clients. It is possible to avoid traffic congestion because of joining the backup multicast packet network only when the stopping of receiving data is detected. This increases the probability of receiving all the packets (changing without short breaks), because of the delayed backup distribution. It significantly increases the probability of receiving all the packets because of the backup distribution which combines the delayed distribution and the real-time distribution.

According to this embodiment, it is possible to restart receiving packets in several tens of milliseconds because the different backup paths are dynamically established using the different multicast addresses. It is possible to avoid unnecessary backup traffic in the normal communication because the establishment of the backup communication paths is requested only in the case of the interruption of the receipt. The present invention increases the probability of receiving all the packets because backup server 2 sends the delayed backup multicast packets since the delay includes the allowable retransmission time in the clients, the delay in transmission to the clients, the time required to detect the interruption of the receipt, and the time required to establish the backup paths.

Moreover, using the un-delayed backup multicast together with the delayed packets, the following effects can be expected. That is, depending on the transmission orders of the delayed backup multicast, the present invention improves the probability to receive all packets, even though the allowable arrival time of each packet significantly depends on the FEC which clients employ. Also, the joining to the backup multicast distribution and the distribution of the delayed backup multicast packets can be cascaded, because the function for joining the backup multicast close to the relay router (directed to upstream) and the function for distributing the delayed backup multicast (directed to downstream) are introduced.

Therefore, it is possible to join the backup multicast immediately, and to achieve the appropriate backup multicast distribution to downstream clients, and thus the present invention increases the probability of receiving all packets.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A communication system including a distribution server which distributes a multicast packet for broadcast, a client which receives the multicast packet via a network, a backup server, and a communication control device, wherein the backup server comprises:

a first receiving device which receives the multicast packet from the distribution server;

a generation device which appends a delay to the received multicast packet and changes a destination of the delayed multicast packet in order to generate a first backup packet and which generates a second backup packet by changing a destination of the received multicast packet without appending a delay; and a sending device which sends the first backup packet and the second backup packet to the network, wherein the communication control device comprises:

a monitor device which monitors a receiving status of the multicast packet;

a second receiving device which receives the first backup packet and the second backup packet when the monitor device detects interruption of the receipt of the multicast packet because of a problem;

a conversion device which changes a destination of the first backup packet and the second backup packet to the destination of the multicast packet; and a distribution device which distributes the first backup packet and the second backup packet for which the conversion device changed the destination.

2. The communication system according to claim 1 wherein:

the distribution device assigns identification information, to the first backup packet for which the conversion device changed the destination, in order to distinguish between the first backup packet and the multicast packet.

3. The communication system according to claim 1 wherein:

the distribution device assigns identification information, to the second backup packet for which the conversion device changed the destination, in order to distinguish between the second backup packet and the multicast packet.

* * * * *